Figure 3:
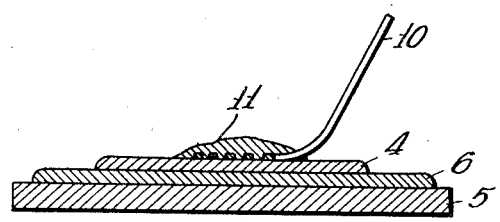

Aug. 7, 1945.  N. W. H. ADDINK  2,381,025
BLOCKING LAYER RECTIFIER
Filed May 29, 1941  2 Sheets-Sheet 1
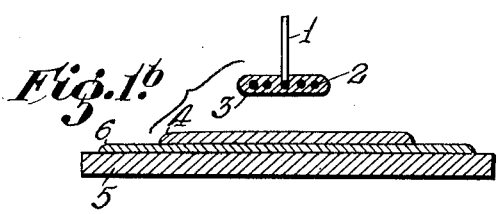
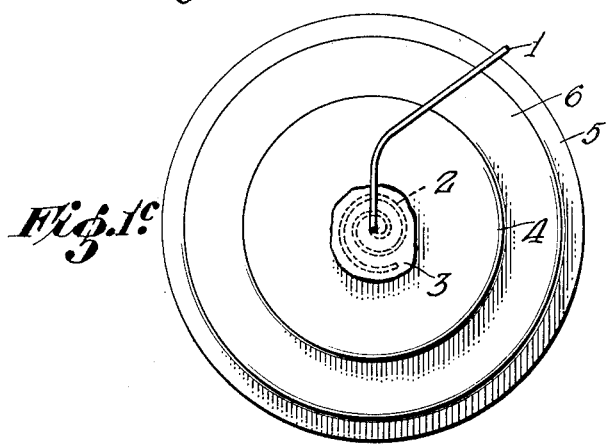
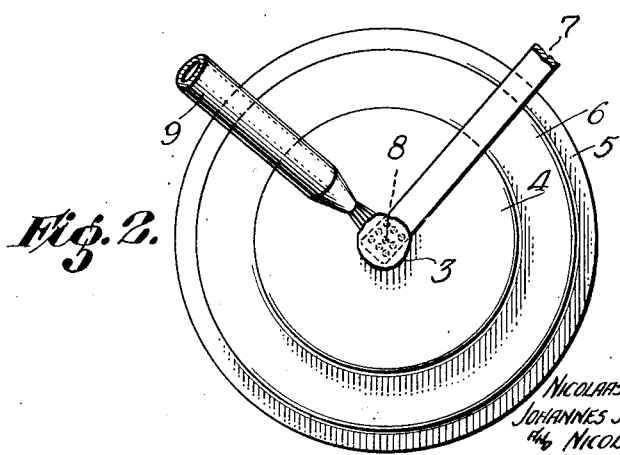
INVENTORS
NICOLAAS WILLEM HENDRIK ADDINK
JOHANNES JACOBUS ASUERUS PLOOS VAN AMSTEL
and NICOLAS BOS
BY
ATTORNEY.

Aug. 7, 1945.   N. W. H. ADDINK   2,381,025
BLOCKING LAYER RECTIFIER
Filed May 29, 1941   2 Sheets-Sheet 2

INVENTORS
NICOLAAS WILLEM HENDRIK ADDINK,
JOHANNES JACOBUS ASUERUS PLOOS VAN AMSTEL,
AND NICOLAAS BOS
BY
ATTORNEY.

Patented Aug. 7, 1945

2,381,025

UNITED STATES PATENT OFFICE 2,381,025

BLOCKING-LAYER RECTIFIER

Nicolaas Willem Hendrik Addink, Johannes Jacobus Asuerus Ploos van Amstel, and Nicolaas Bos, Eindhoven, Netherlands; vested in the Alien Property Custodian Application May 29, 1941, Serial No. 395,872
In the Netherlands June 15, 1940

5 Claims. (Cl. 175—366)

This invention relates to a method of making a good electrical connection to the electrode of a blocking-layer rectifier, and to the blocking-layer rectifiers provided with an electrical connection obtained by this method.

Blocking-layer rectifiers, such as selenium rectifiers and cuprous-oxide rectifiers, generally comprise a so-called counter electrode which consists of a material of good conductivity. To obtain an intimate connection, this electrode is generally applied as a very thin layer of, say, 100 microns in the liquid state and for this purpose it is most convenient to utilise an alloy melting at low temperature. This alloy is applied, for example, by spraying.

To make electrical connection to this electrode of good conductivity is difficult because the thin layer constituting the electrode is readily damaged and the properties of the rectifier consequently deteriorate. With the use of a resilient pressure contact, for example, there is a risk of damage and puncture at the contact portions submitted to pressure. In U. S. patent application of W. C. van Geel et al. Serial No. 304,276 filed November 19, 1939, now U. S. Patent No. 2,303,801 it is suggested to utilize a thin flexible foil or wire as a supply conductor which is metallically connected to the electrode layer. For this purpose the material of the electrode itself is used as a solder.

To make such a metallic connection the electrode material located under the contact end of the supply conductor is melted, for example, with the aid of a soldering iron.

The invention has for its purpose to provide a method of making connections which lends itself to mass production with less risk of damage to the underlying blocking layer at the point of fastening. This method is characterized in that the quantity and the nature of the adhesive matches the nature of the underlayer at the point of fastening so that the amount of heat energy transmitted to the underlayer during fastening is insufficient to affect to an important degree the qualities of the blocking layer at the point of fastening.

In the method of the invention the heat applied is so measured as to produce the desired connection without adversely affecting the quality of the blocking layer, thereby making it unnecessary to again subject the blocking layer to a formation process after applying the connection.

It has been the practice to further process the cell by passing a large current through it to thereby improve the quality of the blocking layer. The method according to the invention makes it unnecessary to use such a complete formation process after the adhesion of the supply conductor is made.

Several examples of the process according to the invention will now be described more fully by reference to the accompanying drawings.

Figs. 1a, 1b, and 1c show an example in which the extremity of the supply conductor is so constructed that, when immersed in molten soldering material, a quantity of this solder in the liquid state is retained which is sufficient to establish the weld while on the other hand this quantity in the molten state contains only so much heat energy as is just sufficient to establish the adhesion.

Fig. 2 relates to a form of construction in which a supply conductor containing the required quantity of low-melting solder at the point of fastening is placed on the rectifier electrode while subsequently an amount of heat is supplied which can be easily dosed, for example with the aid of hot air, so that the solder is just melted without an excess of heat energy being supplied.

Fig. 3 illustrates a form of construction which utilises a conductive paste or a lacquer as a connecting agent which is liquified at a temperature preferably not considerably higher than the ambiant temperature and hardens in air.

Figure 4A:
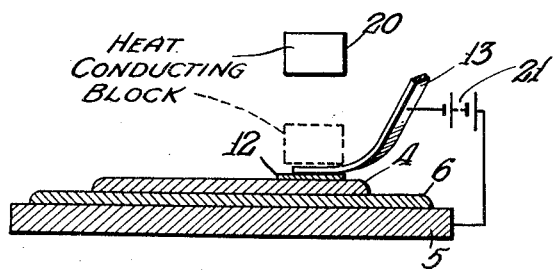
Figure 4B:
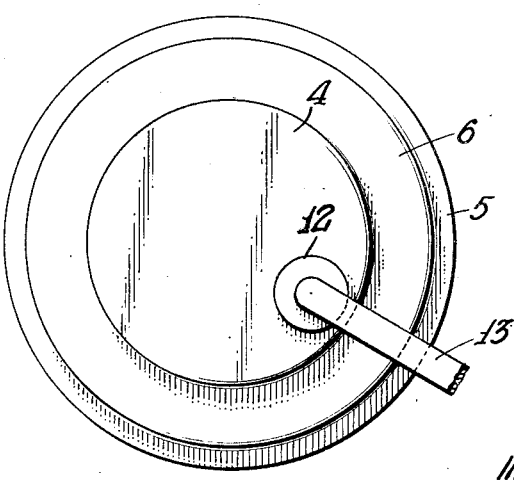

Figs. 4a and 4b show the result of another example of the method whereby at least at the point of fastening of the supply conductor, prior to the fastening thereof, a protective layer is applied which consists of conductive material and, if desired, has a higher melting point than the material of the electrode, the melting point of the material of the protective layer and the manner of application, for example by spraying, being so chosen that the blocking layer at the point of fastening remains intact.

Fig. 1a shows a supply conductor 1 having a contact end 2 formed into a spiral. From the cross-section shown on a somewhat enlarged scale in Fig. 1b it will be seen that this spiral, after immersion in molten solder, retains a quantity 3 of the solder material. During the time that solder is still in the molten state, the supply conductor 1 is placed on the electrode layer 4 of the blocking-layer rectifier, as is shown in elevation in Fig. 1c. The blocking-layer rectifier, of which Fig. 1b is a cross-sectional view, comprises an aluminium carrier plate 5 on which is a selenium layer 6. Between the carrier plate 5 and the selenium layer 6 there may be one or more additional adhering layers of other materials, for example a first layer of zinc and then a layer of carbon, while between the layers 6 and 4 (the electrodes) is a blocking layer. The adhering layers and the blocking layer are, however, not shown for the sake of clearness. The electrode 4 and the solder 3 may consist of the same material, for example, of an alloy of tin, bismuth and cadmium which melts at approximately 100° C. If desired, the material 3 may consist of an alloy melting at a somewhat higher temperature. As soon as the supply wire 1, together with the attached quantity of the material 3, is placed on the electrode 4, the material of the electrode 4 is melted superficially, forming an intimate connection. Since the material 3 contains a limited amount of heat energy, the blocking layer under the electrode 4 at the point of fastening remains perfectly intact and no damage occurs.

If use is made of a supply conductor of different shape, for example, a flexible metal strip, the extremity thereof may be foraminated and the adhesion effected as above described.

With this form of construction the additional advantage is obtained that this method of adhesion may be readily used with blocking-layer rectifiers of small size. The same advantage will also be found with the examples which will be discussed hereinafter.

The form of construction of the rectifier of Fig. 2 is shown very diagrammatically in elevation, corresponding parts being indicated by the same reference numerals as in Fig. 1. The supply conductor 7 used in this case is a strip whose extremity is provided with perforations 8. Such a strip may be immersed in soldering material in the manner referred to above and be placed on the electrode 4. In this arrangement the connecting material may first be made to coagulate and later be melted at the point of fastening by supplying hot air from a blow pipe 9. This offers the advantage that use may be made of foils which have been prepared beforehand in large quantity and provided with soldering material. In this form of construction use is made, for example, of a soldering material having a lower melting point than the material of the electrode 4.

A supply of hot air may also be used with the method described with reference to Fig. 1 in instances when the soldering material has cooled to such an extent that, although it has not yet coagulated the heat energy thereof is inadequate to melt the surface of the electrode 4 at the point of fastening. The hot air then gives the additional heat necessary.

Fig. 3 again shows a supply conductor 10 whose extremity is foraminated. The connecting agent used in this case is a heated conductive lacquer or paste 11. This material is obtained, for example, by mixing 30 grs. of finely grounded graphite with 100 cc. of chlorated rubber lacquer and is applied at a temperature preferably not considerably higher than the ambient temperature.

The material 11 is applied after the current collector 10 is placed on the electrode 4 and is kneaded in position. The conductive lacquer may be spread throughout the surface of the electrode 4 to produce a good current connection to the electrode 4. This expedient may also be used in conjunction with the forms of construction described with reference to the other figures.

Since such a paste generally has a comparatively high resistance, this method is mainly of importance for low-power cells in which the current consumption is of the order of milliamperes.

A supply conductor having a foraminated end as described in the above forms of construction may also be used when the connecting material is applied in a different manner, for example by spraying. In this case the connection between the sprayed layer and the electrode 4 is established through the openings.

As illustrated in the cross-sectional view of Fig. 4a and the associated elevation view of Fig. 4b the electrode 4 of the rectifier is provided at the point of connection with a protective layer 12, before the supply strip 13 is fastened. For the layer 12 use may be made of a material having a higher melting point than the material of the electrode 4, if in the manner of application in accordance with the principle of the invention care is taken that the blocking layer remains intact. The application of this protection layer may be effected, for example, by spraying. The use of a layer of higher melting point offers the advantage that the connection with the strip 13 may be made with a solder melting at a higher temperature. Thus a rigid soldered connection is obtained so that this method is particularly useful for rectifiers which are heavily loaded in operation, since the risk of the connection being loosened by fusion at high operating temperatures is decreased. If this feature is not required, the covering layer may alternatively be made of low-melting material so that the adhesion may also be effected at a lower temperature and consequently the risk of damage to the blocking layer is still further decreased.

By extending the protective layer 12 throughout the surface of the electrode 4, an additional advantage is obtained. As has already been mentioned above, the electrode 4 in general is applied as a thin layer, inter alia because an intimate contact is achieved and because in using alloys melting at low temperature, for example at approximately 100° C., thin layers have been found most convenient. If these alloys are applied as a thick layer, difficulty is involved when the rectifier is highly loaded. For example, at a higher loading of the rectifier the material liquefies and contracts in the form of drops or flows away. With the use of thin layers it is found that the rectifier can endure such an overload. If, now, a covering layer is used consisting of a material which melts at a higher temperature, for example 130° C. to 150° C., then this layer remains intact at a temperature of the rectifier of about 110° C. and the risk of destruction of the electrical properties of the rectifier under overload conditions is reduced.

As a further feature of the invention the covering layer has such a thickness (for example, 0.1 mm.) that a solder contact may be easily formed with it without the heat penetrating to such extent as to melt the material of the underlying electrode positioned on the blocking layer.

In the forms of construction shown in Figs. 1, 2 and 4 the heat which reaches the blocking layer may still further be reduced by carrying away this heat as quickly as possible, after the required flowing of the material at the point of adhesion is effected. This may advantageously be obtained by placing a metal die on the point of adhesion immediately after the flowing of the soldering material, said die being a good conductor of heat and also pressing the contact during coagulation of the soldering material. The foregoing is illustrated in Fig. 4 wherein a die 20 of heat conducting material for example a block of copper, is placed over the point of contact immediately after the flowing of the soldering material as shown in dotted lines.

It is understood that the foregoing method of carrying away heat from the point of adhesion is also applicable to the form of construction shown in Fig. 3 whereby the heated conductive paste is rapidly cooled and pressed into good contact with the terminal 10 and the blocking layer during cooling.

It has been found advantageous to establish the adhesion while a voltage is accomplished at the cell. This may be set up, for example, with the aid of the supply conductor itself which is to be adhered between which conductor and the plate 5 a voltage is applied from a suitable source 21 as shown in Fig. 4. Instead of using the supply conductor the voltage may be applied by means of the die referred to above.

What we claim is:

1. A method of connecting a lead to an electrode of a blocking-layer rectifier containing a layer of low-melting-point material, comprising the steps of immersing the contact end of the lead into a heated molten soldering material to form thereon a coating of said soldering material, limiting the quantity and temperature of the soldering material retained by said contact end to prevent damage of the said layer by the heat transmitted thereto upon applying said contact end to the electrode, and applying said coated contact end to the electrode to adhesively fasten the same to the electrode.

2. A method of connecting a lead to an electrode of a blocking-layer rectifier containing a layer of low-melting-point material, comprising the steps of immersing the contact end of the lead into a heated molten soldering material to form thereon a coating of said soldering material, limiting the quantity and temperature of the soldering material retained by said contact end to prevent damage of the said layer by the heat transmitted thereto upon applying said contact end to the electrode, and applying said coated contact end to the electrode while the soldering material retained thereon is still in a molten state.

3. A method of connecting a lead to an electrode of a blocking-layer rectifier containing a layer of low-melting-point material, comprising the steps of applying over said low-melting-point layer a layer of an electrically conducting material having a melting-point higher than that of said first layer, fastening the lead to said second layer with a heated electrically-conductive adhesive, and limiting the quantity and temperature of the adhesive to prevent damage of the said low-melting-point layer by the heat transmitted thereto.

4. A method of connecting a lead to an electrode of a blocking-layer rectifier containing a layer of low-melting-point material, comprising the steps of applying the contact end of the lead and an electrically-conductive adhesive to the electrode, heating the adhesive to join the said contact end to the electrode, and removing the heat applied to the adhesive by means of a die of good heat-conducting material superposed on the point of adhesion during said joining.

5. In the manufacture of a blocking-layer rectifier containing a layer of low-melting-point material, the steps comprising connecting a lead to an electrode of the rectifier with a heated electrically-conductive adhesive, limiting the quantity and temperature of the adhesive to prevent damage of the layer by the heat transmitted thereto, and applying a voltage across said rectifier while connecting said lead to said electrode.

NICOLAAS WILLEM HENDRIK ADDINK.
JOHANNES JACOBUS ASUERUS
                PLOOS van AMSTEL.
NICOLAAS BOS.